United States Patent Office 2,801,266
Patented July 30, 1957

2,801,266

PROCESS FOR PREPARING AN ISOMERIC MIXTURE OF 6-METHYL-ALPHA-IONONE AND 6-METHYL-BETA-IONONE, HAVING THE ODOR OF IRONE

Hans Schinz, Zurich, Switzerland, assignor to Firmenich & Co., successors de la societe anonyme M. Naef & Cie, Geneva, Switzerland, a corporation of Switzerland No Drawing. Application October 9, 1947, Serial No. 778,752

Claims priority, application Switzerland October 21, 1946

5 Claims. (Cl. 260—587)

The problem of the synthetic production of the true odor of natural irone has given rise to much research, which has hitherto not met with success.

A cyclo-heptenic structure was attributed to natural irone at first (Helv. 25, 188 (1942) (see Formula I)). It was later found to consist of a mixture of isomers, formed for the greater part by a 6-methyl-γ-ionone (Formula II) bearing one of its double bonds in the semi-cyclic position and for the smaller part by variable quantities of 6-methyl-α-ionone (Formula III). The synthesis of a compound of Formula II is very difficult and costly, so that the problem of the synthetic production of the odor of irone appears to be one of the hardest to solve, the more so as the presence of two asymmetric carbon-atoms and the cis-trans-isomerism in the side-chain of the methyl-γ-ionone implies eight isomers of Formula II alone, only one of which, or a mixture of several, is likely to produce the real odor of the different varieties of natural irone.

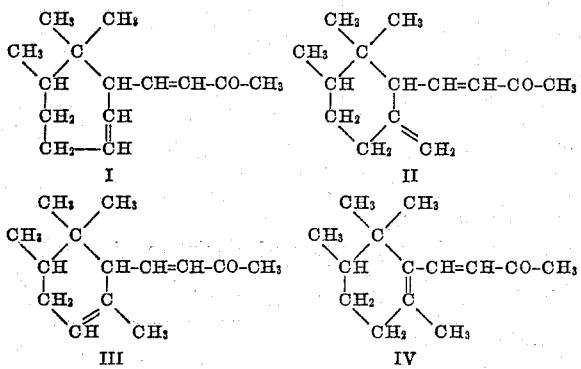

The first fruitless attempt to prepare a 6-methyl-ionone was made by Kilby and Kipping (Soc. 1939, 435). Later, Ruzicka and Schinz (Helv. 23, 959 (1940)) described a method of preparing a product supposed to be a mixture of 6-methyl-α-ionone (Formula III) and 6-methyl-β-ionone (Formula IV), but the odor of this product resembled in no way the typical odour of natural irone. At that time, this fact was explained by the difference in structure between the said methyl-ionones and natural irone, to which a cyclo-heptenic structure was attributed as stated above (Formula I).

When the cyclo-heptenic formula was subsequently excluded, the difference in smell observed between the mixture of the 6-methyl-ionones α and β of Ruzicka and Schinz and natural irone could nevertheless be explained by the new semi-cyclic position of the double bond in the molecule of natural irone.

In applying the processes of preparing ionones to the preparation of methyl-ionones, I was surprised to observe that I had obtained a new mixture of 6-methyl-α-ionone and 6-methyl-β-ionone which possessed the typical odor of irone, in spite of the absence of the isomer γ with its semi-cyclic double bond and despite the fact that the isomer α contained in the mixture was different in its stereochemical structure from the isomer obtained by isomeric change of natural irone by means of sulphuric acid.

The difference in odor observed between this new mixture and that of Ruzicka and Schinz is to be attributed to the fact that the structure of the isomers and that of the stereoisomers is not the same in the two cases.

I have further observed that, on the whole, the mixtures containing 6-methyl-α-ionone and 6-methyl-β-ionone, said mixtures being obtained either as stated above or according to any other method possess the typical odor of irone.

The present invention, which is based on the above observations, relates first to a process for the preparation of the irone-smelling 6-methyl-α-ionone and 6-methyl-β-ionone, compounds which are thus new, since they have never really been prepared hitherto, but only attempted.

This process is characterized in that eta-methylpseudoionone is subjected to a ring-closing which gives jointly and in mixture 6-methyl-α-ionone and 6-methyl-β-ionone, and in that one at least of these isomers is separated from the mixture obtained. The separation of the two isomers may be effected either by physical methods, such as fractional distillation, or by chemical methods, for example, by utilising the carbonyl group to form a crystallisable derivative.

The isomer α has a more delicate odor than the isomer β, but the odor of the latter seems, on the other hand, to be stronger. Like the odor of ionones, the odor of the 6-methyl-ionones α and β, depend a good deal on their purity.

The present invention also relates to a new product with the odor of irone, characterised in that it is constituted at least in part by 6-methyl-α-ionone and 6-methyl-β-ionone, mixed together.

The odor of this new product most nearly approaches that of natural irone when the relative proportions of the isomers that it contains correspond to 65–95 parts in weight of isomers of the type 6-methyl-α-ionone for 35–5 parts in weight of isomers of the type 6-methyl-β-ionone.

The present invention further comprises a process for preparing a new product having the odor of irone, which consists simply in subjecting the η-methylpseudoionone to a ring-closing during which are formed the isomers 6-methyl-α-ionone and 6-methyl-β-ionone.

The η-methylpseudoionone used as starting material may be prepared according to the general indications given below, in which γ-methyl-linalool (Formula V) is transformed by allyl rearrangement into ε-methyl-geraniol (Formula VI), which is oxidized into ε-methyl-citral (Formula VII), and the latter is condensed with acetone to give η-methylpseudoionone (Formula VIII). Formulae IX and X are respectively those of the isomers γ and β which form jointly during the ring-closing process.

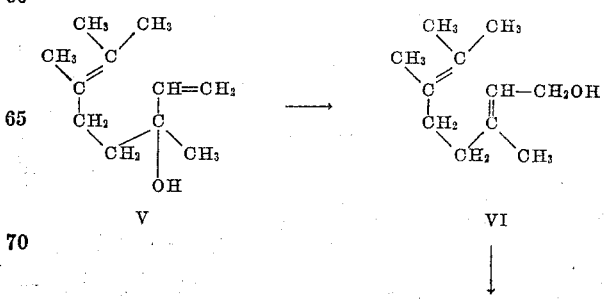

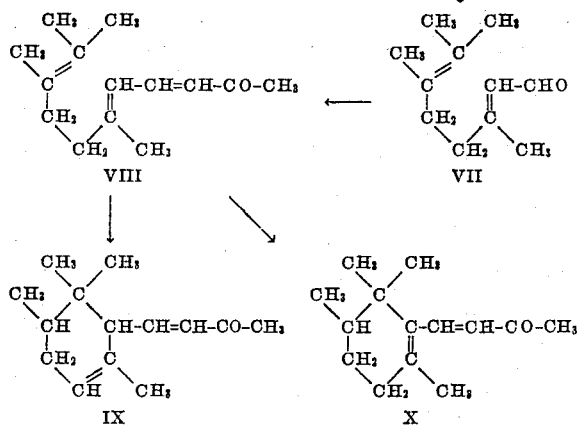

To prepare mixtures in which one or the other of the two isomers is predominant, the same methods may be used as those already employed for the preparation of the ionones α and β.

The γ-methyl-linalool (Formula V) has been described by Kilby and Kipping. Its allyl rearrangement, which these authors were not able to effect, may be obtained by the usual methods, for example, by means of a mixture of acetic anhydride and glacial acetic acid. The oxidation of the ε-methyl-geraniol is easily done, for example, by the method of Oppenauer-Lauchenauer and gives the ε-methyl-citral, which is then condensed with acetone.

It is not necessary, however, to isolate the ε-methyl-citral before condensing it with acetone, the oxidation and the condensation being practicable in a single operation which directly yields the η-methylpseudoionone (Formula VIII). Needless to say, the manner of preparing the latter compound does not influence its subsequent ring-closing or the smell of the products which result from it insofar as its stereochemical identity is the same.

The η-methylpseudoionone used as starting material in the invention may, for example, be prepared as follows.

Ten kgs. of γ-methyl-linalool (Formula V) mixed with 7 kgs. of acetic anhydride and 7 kgs. of glacial acetic acid are heated for 6 hours at 150°–155° C. Through distillation under 0.2 mm. pressure, 5.6 kgs. of a fraction which distils between 71° and 74° C. are separated. After saponification for 3 hours with 3 kgs. of potassium hydroxide in 15 litres of methanol, 4.5 kgs. of reaction product are obtained, 2.7 kgs. of which distil under 0.2 mm. pressure between 73° and 74° C. and are ε-methyl-geraniol (Formula VI). The allophanate of this ε-methyl-geraniol melts at 108–109° C. The 2.7 kgs. of methyl-geraniol are afterwards mixed with 3.4 kgs. of distilled aluminium isopropylate, 40 litres of absolute benzene and 40 litres of absolute acetone. The whole mixture is heated with reflux for 60 hours. The acetone and the benzene are then distilled on the water-bath; the product is cooled to 0° C. and hydrolysed with an excess of hydrochloric acid in the presence of ether. After the product has been washed to neutrality, it is subjected to fractional distillation. 1.08 kg. of η-methylpseudoionone (Formula VIII) are obtained. B. P. under 0.01 mm. of Hg 91–92° C.; $n_D^{20}=1.5338$; $d_4^{20}=0.9044$; 2,4-dinitrophenylhydrazone: M. P. 148–150° C.

The process according to the present invention may be carried out as follows:

*Example 1*

One kg. of this η-methylpseudoionone prepared as indicated above is introduced into 4 kgs. of phosphoric acid ($d_4^{15}=1.65$) cooled to —4° C. so that the temperature does not rise above 0° C. A good mechanical stirring is useful. The solution is kept at 0° C. for 20 minutes, then heated for 15 minutes at 50.55° C. After this treatment, it is poured on to ice and the mixture of 6-methylionones formed is separated by the usual methods. 660 grammes of a mixture of isomers are obtained which contain, according to the absorption spectrum, only 15% of isomers of the β type.

The physical constants of this new mixture of isomers are: B. P. under 0.01 mm. of Hg 68–73° C.; $n_D^{19}=1.5001$; $d_4^{19}=0.9345$. About a third of the mixture gives a phenylsemicarbazone which melts after crystallisation at approximately 166–167° C., depending upon the degree of purity. This is the derivative of the 6-methyl-α-ionones which does not colour in light. This phenylsemicarbazone is different from that of natural irone and from that obtained with a natural irone isomerised with sulphuric acid. This phenylsemicarbazone allows regenerating, by hydrolysis, the 6-methyl-α-ionone, which possesses the characteristic fragrance of natural irone.

The physical constants of the 6-methyl-α-ionone thus obtained are: B. P. 70–71° C. under 0.01 mm. of Hg; $n_D^{19}=1.5012$; $d_4^{19}=0.9397$.

*Example 2*

One kg. of η-methylpseudoionone, prepared as indicated above and cooled to —10° C., is introduced into 3.5 kgs. of sulphuric acid (98%), mixed with 1.5 kg. of acetic acid also cooled to —10° C. so that the temperature does not rise too quickly to 20–25° C. After having kept this temperature for 20 minutes, the mixture is poured onto ice. A good stirring is kept up throughout the operation. After the usual treatment for separating the reaction products, 720 grammes of a mixture of 6-methylionones α and β are obtained. This new mixture presents the following physical constants: B. P. 69–75° C. under 0.01 mm. of Hg; $n_D^{16}=1.5182$; $d_4^{16}=0.9501$. By fractional distillation under 0.1 mm. in a "Heligrid" fractionating column with a total-reflux column head, about 50% of first runnings distilling between 70 and 75° are drawn off. These first runnings are composed of the mixture of the two isomers α and β. The next fraction, which distils between 75 and 78° C. is composed almost entirely of 6-methyl-β-ionone. The latter presents the following physical constants: B. P. 75–76° under 0.01 mm. of Hg; $n_D^{16}=1.5197$; $d_4^{16}=0.9551$.

The new mixtures of α and β-methylionones, obtained by ring-closing of the η-methylpseudoionone, the latter being prepared either as stated in Example 1 or according to any other method constitute excellent products smelling of irone. They may be directly employed in perfumery.

What I claim is:

1. Process for preparation of a mixture of 6-methyl alpha ionones and 6-methyl beta ionone containing the alpha isomers in major proportion, said mixture having the fragrant odor of irone, comprising converting gamma methyl linalool to ε-methyl geraniol by allylic rearrangement, subjecting the ε-methyl geraniol to an Oppenauer reaction in the presence of an excess of acetone whereby the ε-methyl citral formed condenses with the acetone to form eta-methyl pseudoionone and subjecting said eta-methyl pseudoionone to ring closing to obtain said mixture of 6-methyl alpha ionones and 6-methyl beta ionone, said cyclization being effected with a cyclizing agent selected from the group consisting of phosphoric acid and about 3.5 parts by weight of 98% sulfuric acid diluted with about 1.5 parts by weight of acetic acid.

2. A process for preparing a product having the fragrant odor of irone comprising ring-closing η-methyl-pseudoionone by treating the latter with phosphoric acid.

3. A process for preparing a product having the fragrant odor of irone comprising ring-closing η-methyl-pseudoionone by treating the latter with a mixture of about 3.5 parts by weight of about 98% sulphuric acid with 1.5 parts by weight of acetic acid.

4. Process for forming a mixture of 6-methyl alpha ionones and 6-methyl alpha ionone having the fragrant odor of irone, comprising cyclizing eta-methyl pseudoionone with a cyclizing agent comprising about 3.5 parts by weight of 98% sulfuric acid diluted with about 1.5 parts by weight of acetic acid.

5. The 6-methyl-alpha-ionone isomers formed in admixture with 6-methyl-beta-ionone by cyclizing eta methyl pseudoionone to obtain said mixture of 6-methyl-alpha-ionones and 6-methyl-beta-ionone, said cyclization being effected with a cyclizing agent selected from the group consisting of phosphoric acid and about 3.5 parts by weight of 98% sulfuric acid diluted with about 1.5 parts by weight of acetic acid.

References Cited in the file of this patent

UNITED STATES PATENTS

| | | |
|---|---|---|
| 556,943 | Tiemann | Mar. 24, 1896 |
| 775,251 | Schmidt | Nov. 15, 1904 |

OTHER REFERENCES

Kilby et al.: J. Chem. Soc., 1939 volume, pp. 435–439.

Ruzicka et al.: Helv. Chim. Acta, vol. 23, pp. 959–974 (1940).

Royals: Ind. Eng. Chem., vol. 38, No. 5, pp. 546–548, May 1946.

Yomashita et al.: Chemical Abstracts, vol. 41, cols. 3041–3042 (1947).